United States Patent [19] [11] 3,920,799
Wiebke et al. [45] Nov. 18, 1975

[54] PROCESS FOR PREPARING SILICON TETRACHLORIDE FROM SILICON CARBIDE WITH HYDROGEN CHLORIDE

[75] Inventors: Günter Wiebke, Munich; Günter Stohr, Kempten; Günter Kratel, Durach; Johann Kral, Kempten, all of Germany

[73] Assignee: Elektroschmelzwerk Kempten GmbH, Munich, Germany

[22] Filed: Apr. 18, 1974

[21] Appl. No.: 462,072

[30] Foreign Application Priority Data
Apr. 19, 1973 Germany............................ 2319995

[52] U.S. Cl............... 423/341; 252/441; 260/676 R
[51] Int. Cl.² ........................................ C01B 33/08
[58] Field of Search................... 423/341, 343, 342; 252/441

[56] References Cited
UNITED STATES PATENTS
1,939,647  12/1933  Arnold............................... 252/441
2,686,819  8/1954  Johnson ........................ 260/449 M
2,843,458  7/1958  Beattie................................ 423/343

FOREIGN PATENTS OR APPLICATIONS
728,919  4/1955  United Kingdom................. 423/341
36-23155  11/1961  Japan................................. 423/342

OTHER PUBLICATIONS
Mellor, J. W. A Comprehensive Treatise On Inorganic and Theoretical Chemistry, Vol. 2, Longmans, Green & Co., (1920), p. 31.

Primary Examiner—Oscar R. Vertiz
Assistant Examiner—Michael L. Lewis
Attorney, Agent, or Firm—Allison C. Collard

[57] ABSTRACT

In a process for preparing silicon tetrachloride from silicon carbide and/or silicon carbide containing mixtures with hydrogen chloride the improvement which consists in carrying out the reaction in the presence of cobalt chloride or nickel chloride or a mixture of both at temperatures ranging from 400°C to 1,000°C.

2 Claims, 1 Drawing Figure

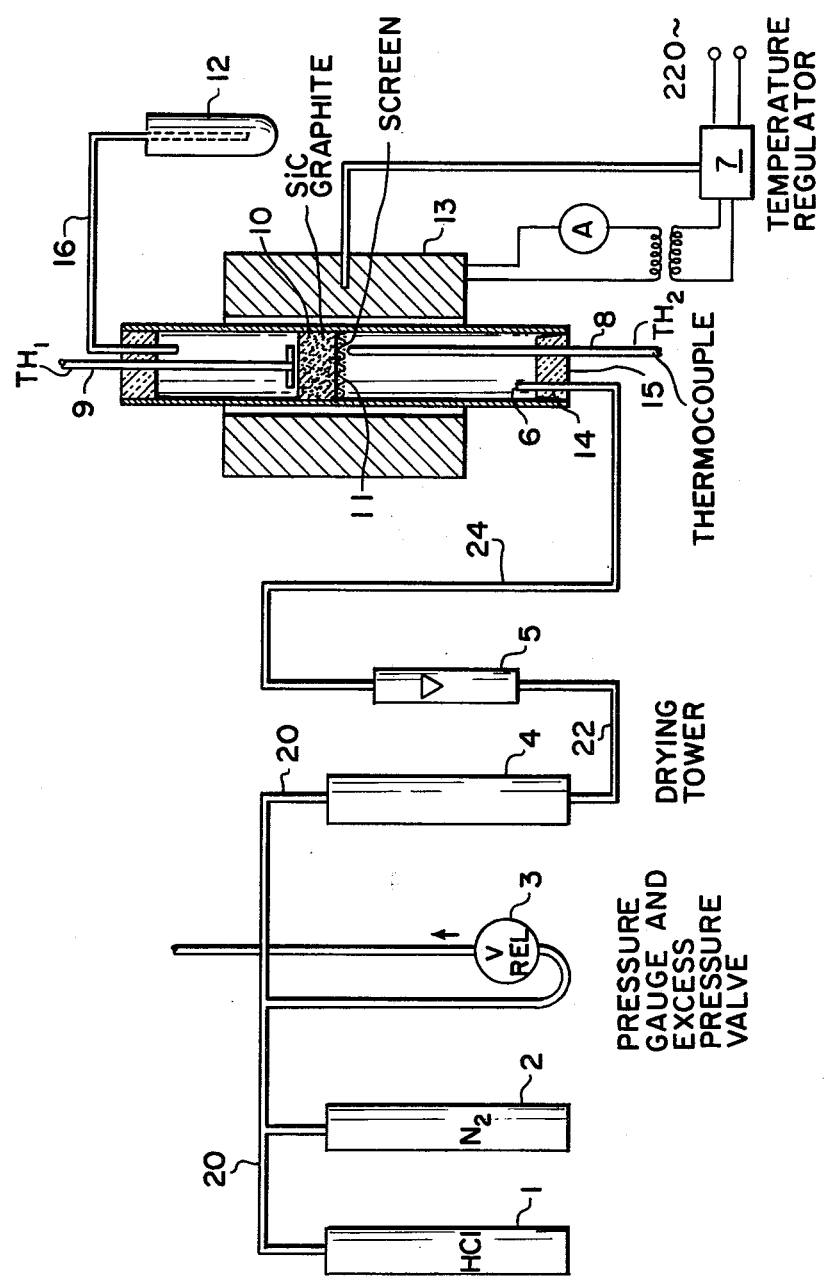

PROCESS FOR PREPARING SILICON TETRACHLORIDE FROM SILICON CARBIDE WITH HYDROGEN CHLORIDE

The present invention relates to a process for preparing silicon tetrachloride from silicon carbide with hydrogen chloride.

The chlorination of silicon carbide with HCl has been known for a long time and is supposed to take place at red heat according to the following equation $$SiC + 4 HCl = SiCl_4 + CH_4$$

(see Britzke, Chemikerzeitung 33, (1909) 1099).

However, up to now, this reaction could not be put into practice on an industrial scale because only small yields were obtained even at higher temperatures.

It is also known to produce silicon tetrachloride from very pure silicon and HCl, by applying metal compounds, e.g. iron chloride, onto the silicon in order to decrease the temperature of ignition. In accordance with the last mentioned process, residues containing silicon carbide could also be processed, which are obtained in the production of silicon carbide, such residues lending themselves to the preparation of silicon tetrachloride. (See D.B.P. 1,105,398).

According to the present invention a process has now been found for preparing silicon tetrachloride by reaction of silicon carbide and/or silicon carbide-containing mixtures with HCl in the presence of heavy metal chlorides wherein the reaction is carried out in the presence of cobalt chloride and/or nickel chloride at temperatures ranging from 400°C to 1,000°C, and preferably at temperatures between 600° and 900°C.

Whereas heavy metal compounds, particularly chlorides, are said to be readily carried off, (see H. Schaefer "Chemische Transportreaktionen" Verlag Chemie, 1962) which means that these chlorination catalysts are used up rapidly, this fact has not been observed under the conditions of the process of the invention in the preparation of silicon tetrachloride from silicon carbide with hydrogen chloride, and the silicon carbide used is almost completely converted in the reaction.

The amount of cobalt chloride and/or nickel chloride which catalyzes the reaction of silicon carbide with HCl, is 0.1 – 30 percent by weight, preferably 1 – 10 percent by weight calculated on the silicon carbide-containing starting material.

The catalyst can be added to the silicon carbide in solid form, e.g., as powder. As a rule, the metal compound is added to the silicon carbide from a solution. The solvent used for this purpose is water or diluted hydrochloric acid.

The catalyst can also be introduced into the reaction chamber by impregnating an inert carrier, such as $SiO_2$ and active carbon, in mixtures with silicon carbide.

The silicon carbide used in the preparation of the silicon tetrachloride is mostly conventionally prepared, technical silicon carbide, but mixtures of materials containing silicon carbide, for instance ceramic materials having a content of silicon carbide, may also be used.

The silicon carbide can be chlorinated in granulated form in a fixed bed reactor, or preferably in powder form or in the form of very small grains in a fluidized bed reactor, in a continuous operation. Before the reaction takes place, the filling is dried by means of an inert gas, e.g. by nitrogen, and heated up to reaction temperature. It is advantageous to dry the HCl, too, before application.

To heat up the reactor to the reaction temperature, suitable "fuels" as for example silicon metal, ferrosilicon, silizides and similar compounds may be used. The chlorination is an exothermal reaction and may, therefore, be carried out autothermally. If, nevertheless, heat losses occur, they can be compensated by addition of the above named fuels.

In the accompanying drawing an arrangement for carrying out the invention is schematically illustrated.

The device comprises a bottle of hydrogen chloride, designated by 1, a bottle 2 containing nitrogen, a manometer 3 serving at the same time as excess pressure valve, when pressure accumulates in the reactor. A drying tower 4 and a rotameter 5 are likewise provided. A main pipe line 20 connects bottle 1 to drying tower 4 with branch lines leading to the main line from bottle 2 and manometer 3. Appropriate connecting lines 22 and 24 are also provided for leading from drying tower 4 to rotameter 5 and from there to a reactor 6, respectively. In the reactor tube the conversion of silicon carbide into silicon tetrachloride takes place. The tube consists of quartz or aluminum oxide-containing material which is electrically heated from the outside by a jacket 13. The temperature is maintained at a constant level by a regulator 7 connected to tube 6 over an ampere-meter A. In the reaction zone and at the entrance of the same, the temperature is checked by two thermocouples, 8 and 9 respectively. A gas permeable graphite cushion 11 arranged within the tube 6 serves as a support for the granulated silicon carbide 10 to be reacted with HCl gas, dried by nitrogen; the HCl enters the reactor at an inlet 14 in the bottom closure 15. The gaseous reaction product escapes at the top through line 16 and is collected in a trap 12 cooled by acetone and $CO_2$.

In the following, the process of the invention will be more fully described in a number of examples which are given by way of illustration only, and not by way of limitation.

EXAMPLE 1

To 45 g silicon carbide of a grain size 1 – 3mm, 5 g $Co^{II}$ chloride . 6 $H_2O$ are added from an aqueous (50 ml) solution. The reactor shown in the drawing is filled with this SiC after drying and heating is effected to 700°C for one hour in an $N_2$-current current of 50 l/h. Subsequently, gaseous HCl is passed through the reactor filling.

The table below shows operational data and result.

| HCl passage | Reactor Temp. | HCl conversion | Conversion of Si into $SiCl_4$ in 4 hrs. |
|---|---|---|---|
| 50 l/h | 700°C | 60.7% | 95% by weight |

EXAMPLE 2

45 g SiC of a grain size 1 – 3 mm are mixed with 3.5 g granulated carbon of the same grain size, which were impregnated with 5 g $Co^{II}$ chloride . 6 $H_2O$, and reacted in reactor 6 as described in example 1.

The following table shows operational data and result.

| HCl passage | Reactor temp. | HCl conversion | Conversion of Si into SiCl₄ in 4 hrs |
|---|---|---|---|
| 50 l/h | 700°C | 59.2% | 92% by weight |

EXAMPLE 3

Instead of Co$^{II}$chloride . 6 H$_2$O, 5 g nickel$^{II}$ chloride . 6H$_2$O are placed into the fixed bed reactor and the chlorination performed as in example 1.

The following table shows operation data and result.

| HCl passage | Reactor temp. | HCl conversion | conversion of Si into SiCl₄ in 4 hrs. |
|---|---|---|---|
| 50 l/h | 700°C | 48% | 90% by weight |

EXAMPLE 4

43 g SiC, grain size 180–200um are impregnated with 7 g Co$^{II}$chloride . 6 H$_2$O from an aqueous solution; after drying for an hour in an N$_2$ current of 50 l/h and heating to a temperature of 700°C, the chlorination is carried out as in example 1. However, instead of carrying out the reaction in a fixed bed reactor a fluidized bed reactor is used in one case, and a reactor with a stirrer in another case.

The following table shows reactional data and results.

| HCl passage | Reactor temp. | HCl conversion | Conversion of Si into SiCl₄ in 4 hrs. |
|---|---|---|---|
| Fluidized bed reactor | 700°C | 80% | 99.5% by weight |
| Reactor with stirrer 25 l/h | 700°C | 92% | 99.5% by weight |

EXAMPLE 5

To 50 g SiC of a grain size 1 – 3mm, 2.7 g Co$^{II}$ chloride . 6H$_2$O and 2.7 g nickel$^{II}$chloride . 6 H$_2$O are added from an aqueous (50 ml) solution. The mixture is reacted with HCl in the device described in the drawing and in the manner indicated in example 1, after having been dried with an N$_2$current for one hour, (heating temperature 700°C).

Operational data and result are shown in table below.

| HCl passage | Reactor temp. | HCl conversion | Conversion of Si into SiCl₄ in 4 hrs. |
|---|---|---|---|
| 50 l/h | 700°C | 64% | 99.6% by weight |

It will be obvious to those skilled in the art that other changes and variations can be made in carrying out the present invention without departing from the spirit and scope thereof as defined in the appended claims.

What is claimed is:

1. In a process of preparing silicon tetrachloride from silicon carbide and silicon carbide-containing mixtures by reacting with hydrogen chloride the improvement, which consists in carrying out the reaction in the presence of a member of the group consisting of cobalt chloride, nickel chloride and a mixture of both, at temperatures ranging from 400°C to 1000°C.

2. The process as claimed in claim 1, wherein the reaction is carried out at a temperature between 600° and 900°C.

* * * * *